United States Patent
Lyman et al.

(10) Patent No.: US 7,884,502 B2
(45) Date of Patent: Feb. 8, 2011

(54) DEPLOYABLE POWER SUPPLY SYSTEM

(75) Inventors: Zachary Lyman, Washington, DC (US); Cabot Lyman, Cushing, ME (US); Henry Gentenaar, Arlington, VA (US)

(73) Assignee: Zerobase Energy, LLC, Cos Cob, CT (US)

( * ) Notice: Subject to any disclaimer, the term of this patent is extended or adjusted under 35 U.S.C. 154(b) by 164 days.

(21) Appl. No.: 11/836,335

(22) Filed: Aug. 9, 2007

(65) Prior Publication Data

US 2009/0039705 A1    Feb. 12, 2009

(51) Int. Cl.
*H01L 31/045* (2006.01)
*H01L 31/048* (2006.01)

(52) U.S. Cl. .......................... 307/64; 136/244; 136/251

(58) Field of Classification Search .................... 307/64; 136/251

See application file for complete search history.

(56) References Cited

U.S. PATENT DOCUMENTS

| | | | |
|---|---|---|---|
| 2,951,163 A * | 8/1960 | Shaffer et al. | 250/214 SG |
| 4,122,396 A * | 10/1978 | Grazier et al. | 455/343.1 |
| 4,421,943 A * | 12/1983 | Withjack | 136/246 |
| 4,682,833 A * | 7/1987 | Ferchau et al. | 439/377 |
| 5,379,596 A * | 1/1995 | Grayson | 62/3.62 |
| 5,515,239 A | 5/1996 | Kamerman et al. | |
| 5,522,943 A | 6/1996 | Spencer et al. | |
| 5,602,721 A | 2/1997 | Slade et al. | |
| 5,801,632 A * | 9/1998 | Opal | 340/585 |
| 5,808,871 A | 9/1998 | Rosecan et al. | |
| 5,940,274 A | 8/1999 | Sato et al. | |
| 5,969,501 A * | 10/1999 | Glidden et al. | 320/101 |
| 6,021,642 A * | 2/2000 | Guinn | 62/3.6 |

(Continued)

OTHER PUBLICATIONS

Foldable Solar Panel Generator, product description available on website oksolarcom/n_cart/product_details.asp?ProductID=00184, date unknown, 1 pp.

(Continued)

*Primary Examiner*—Jared J Fureman
*Assistant Examiner*—Adi Amrany
(74) *Attorney, Agent, or Firm*—Cantor Colburn LLP

(57) ABSTRACT

A self-contained conveyable power unit for producing 12V/24V, 110V AC, and 220V AC electricity at a desired location independent of external power sources integrates within one weather-resistant molded nonmetallic material based housing a power generating device of a selectable combination of a renewable energy type (e.g., solar), power management devices, power storage devices and management reporting devices. Additional optional power generating devices, renewable or of traditional fuel type, can be contained within or coupled to the housing. The system includes devices or an array of devices contained within the housing for the storage of electrical power. A device for power management is contained within the housing as is networking equipment of wireless or wired type for remote system observation and reporting. The system and housing are modular and configured to produce power using any combination of renewable and non-renewable energy resources. The conveyable power unit may provide easy access to different types of power outputs and inputs and be coupled with like appliances in a 'daisy chain' or network of power. Given its molded composite material construction and scaleable design, the appliance may be readily fabricated in a variety of sizes for varied applications. Further, the molded housing of composite material construction is designed for resistance to the elements, light weight and strength.

21 Claims, 12 Drawing Sheets

U.S. PATENT DOCUMENTS

| | | | |
|---|---|---|---|
| 6,201,181 B1* | 3/2001 | Azzam et al. | 136/244 |
| 6,376,764 B1* | 4/2002 | Luo | 136/244 |
| 6,396,239 B1 | 5/2002 | Benn et al. | |
| 6,476,311 B1* | 11/2002 | Lee et al. | 136/244 |
| 6,563,048 B2* | 5/2003 | Holt et al. | 174/50 |
| 6,650,085 B2* | 11/2003 | Lau et al. | 320/101 |
| D489,680 S * | 5/2004 | Stobart | D13/107 |
| 6,737,573 B2* | 5/2004 | Yeh | 136/245 |
| 6,751,963 B2* | 6/2004 | Navedo et al. | 62/6 |
| 6,932,443 B1* | 8/2005 | Kaplan et al. | 312/213 |
| 7,105,940 B2 | 9/2006 | Weesner et al. | |
| 7,132,833 B2* | 11/2006 | Layden et al. | 324/429 |
| 7,160,113 B2* | 1/2007 | McConnell et al. | 434/365 |
| 7,230,819 B2* | 6/2007 | Muchow et al. | 361/601 |
| 7,339,286 B1* | 3/2008 | Chen | 290/55 |
| 7,360,919 B2* | 4/2008 | Chan | 362/183 |
| 7,388,348 B2* | 6/2008 | Mattichak | 320/101 |
| 7,481,070 B2* | 1/2009 | Costanzo | 62/235.1 |
| 7,508,163 B2* | 3/2009 | Batts-Gowins | 320/105 |
| 7,565,968 B2* | 7/2009 | Lindley | 206/223 |
| 2002/0171335 A1* | 11/2002 | Held | 312/223.6 |
| 2002/0180404 A1* | 12/2002 | Benn et al. | 320/101 |
| 2003/0009954 A1* | 1/2003 | Bradley | 52/79.1 |
| 2003/0025791 A1* | 2/2003 | Kaylor et al. | 348/143 |
| 2004/0124711 A1 | 7/2004 | Muchow et al. | |
| 2005/0137942 A1* | 6/2005 | LaFleur | 705/27 |
| 2005/0161079 A1* | 7/2005 | Gray | 136/291 |
| 2005/0162121 A1* | 7/2005 | Chan | 320/101 |
| 2006/0137348 A1* | 6/2006 | Pas | 60/641.1 |
| 2006/0260672 A1* | 11/2006 | Niederer | 136/251 |
| 2006/0289547 A1* | 12/2006 | Ewing et al. | 220/592.2 |
| 2007/0171888 A1* | 7/2007 | Adams | 370/346 |
| 2007/0222410 A1* | 9/2007 | Lee | 320/101 |
| 2008/0196758 A1* | 8/2008 | McGuire | 136/245 |
| 2008/0283114 A1* | 11/2008 | Gray | 136/245 |
| 2008/0299899 A1* | 12/2008 | Wolfe | 455/15 |
| 2009/0038673 A1* | 2/2009 | Ware | 136/246 |

OTHER PUBLICATIONS

SunWize Power Station, product description available on website solarwindworks.com/Products/Power_Stations/power_stations. htm, date unknown, 1 pp.

Advancedmart Multi-purpose 12V, 700mA, Portable Briefcase Solar Generator, product description available on website store. advancedmart.com/mu12vbrsoge1.html, date unknown, 1 pp.

Ferris Portable Power Module, product description available on website hamiltonferris.com/acc-module.html, date unknown, 1 pp.

Water-Powered Generators, product description available on website hamiltonferris.com/water-power.html, date unkown, 4 pp.

* cited by examiner

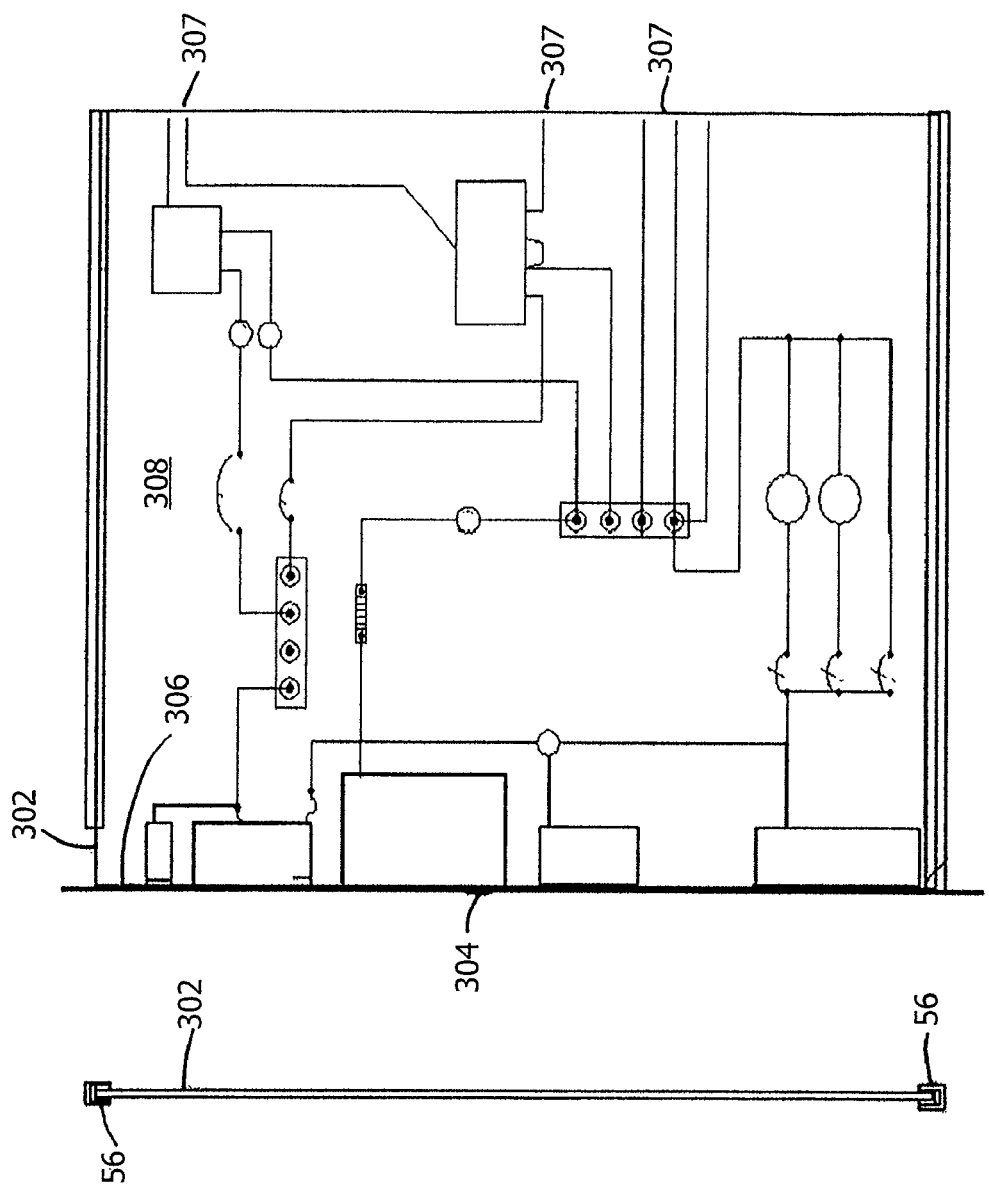
FIG. 11
FIG. 10
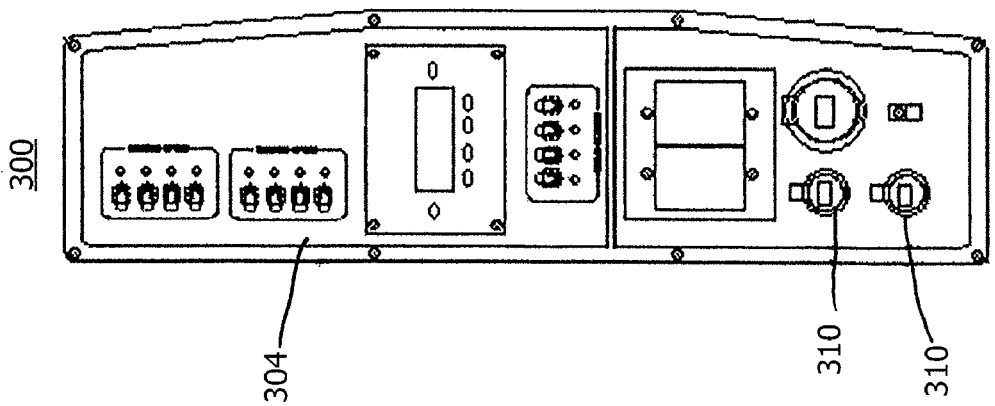
FIG. 9

DEPLOYABLE POWER SUPPLY SYSTEM

BACKGROUND OF THE INVENTION

1. Field of the Invention

The present invention relates to self-contained power supply systems. More particularly, the present invention relates to systems that may be deployed to remote locations and that provide a self-contained power supply. Still more particularly, the present invention is a self-contained, conveyable energy conversion and storage device using ambient resources as the primary energy source. The system may include a plurality of power sources, including ambient power sources.

2. Description of the Prior Art

There are many instances in which portable power supplies are required, or at least preferred. In one instance, power may be required at a location where the primary power grid is not functioning, particularly where critical resources must be maintained. In another instance, power may be required at a location that is distant from any usable primary power grid, such as a remote location where no distribution infrastructure exists including, for example, a boat at sea. Traditional portable generators exist for such instances; however, they are bound to fossil-fuel energy sources that may not be available in sufficient supply for extended periods of time. Moreover, those that may be suitable for relatively extended use may be so large as to make them portable in name only. Therefore, it is desirable to have available a deployable power supply that is not limited in its functionality by non-renewable energy resources and that is reasonably portable.

There is a large and growing market for clean energy due to increased concern about climate change and energy security. Traditional back-up power products, based on fossil fuels, are problematic. Issues of fuel delivery, maintenance, noise, and emissions restrict their feasibility and hamper the delivery of power to those who need it. Traditional renewable energy installations are complex projects involving the purchase and integration of multiple components in customized configurations. Solar energy projects, for one, require long lead times, professional analysis of installation sites, and the purchase of difficult-to-integrate power generation and management systems that, once installed, are permanent and difficult to expand. Therefore, it is desirable to have available a deployable renewable energy-based power supply that exists in a standardized platform with "plug-and-play" integration and management for a broad range of applications.

Attempts have been made to design portable power supplies including renewable energy sources; however, they are of limited desired commercial interest for a variety of deficiencies. One limitation is that they are custom structures of unique design for specific applications. That is, they generally involve the cobbling together of pre-existing items without a unifying arrangement of the items. Another limitation is that they are not readily integrated into existing power transfer systems. Yet another limitation is the portable container used to contain the power source components. They may not be appropriately formed or fabricated to make them convenient for use or movement, they may not be suitable for protecting the internal components in the environments to be experienced, or a combination of both limitations. Therefore, it is desirable to have a deployable power supply including a housing that is structurally sound, convenient to use, and standardized to support a broad range of applications.

SUMMARY OF THE INVENTION

It is an objective of the present invention to provide a deployable power supply arranged to use an array of energy sources including, but not limited to ambient (renewable) and non-renewable resources. It is also an objective of the present invention to provide such a deployable renewable energy-based power supply that exists in a standardized platform with a coupling arrangement suitable to allow the user to simply insert a module of interest therein in a format commonly referred to as "plug-and-play" integration, and management for a broad range of applications. Further, it is an objective of the present invention to provide a device to encapsulate a deployable power supply in a structurally sound, convenient to use, and standardized housing to support a board range of applications.

These and other objectives are achieved with the present invention, which is a deployable power supply system including a standardized housing and a modular arrangement for supplying energy using an array of renewable and non-renewable energy sources. The system of the present invention obviates the problems associated with customized complexity with a simple-to-install arrangement that is easy to operate, scale, maintain and transport, and which catalyzes the diffusion and adoption of renewable energy. More particularly, the present invention provides a dedicated platform designed to receive and integrate elements in an efficient, easily assembled, serviced and transported manor. The combined elements establish an energy conversion system that takes and/or makes energy, stores that energy, and enables the transfer of that energy. The easy usability and transportability of the system facilitates the rapid and broad deployment of clean energy to regions and situations where clean, fuel-free energy is an advantage, but is unavailable due to the non-existence of deployable renewable energy sources. The invention offers relief groups, the military, first-responders, homeowners and others a fast, clean-energy option wherever they are located.

The invention hybridizes renewable power generation and uses an open architecture approach, incorporating any common, off-the-shelf or custom-constructed or configured power production, power storage, and/or power management components. The interchangeability of power production devices lends flexibility to application and output. A standardized, plug-and-play interconnection design lets any technology easily connect to the system's central interface structure. The system is manageable via remote diagnostics and control. It is scaleable, with each stand-alone unit rapidly linkable to the next in a "daisy chain" of power, Because the system is preferably arranged to generate its primary power from renewable energy, heat, noise and emissions signatures are significantly reduced. The system is an important alternative for customers in a wide range of markets including healthcare, security, any of a variety of government functions, and tourism.

The invention is ready to use when it leaves the factory and is easy to operate by untrained individuals, making it ideal to generate power either on-grid or off for end-users looking for short-term, long-term, primary or back-up power. The system is configured to provide essential power for most any designated period of time without the need for fuel delivery, making it suitable for emergency conditions, including for extended periods of time. It is easily deployable by truck, boat, or helicopter and components can be shipped separately and assembled on site. Applications include municipal lighting, water pumping and filtration, emergency/evacuation sites, cell phone towers, lighting, computing, communications, perimeter and observation sensing, battery-powered device battery recharging, vaccine or pharmaceutical refrigeration, biodiesel or other fuel generation aid or storage, and numerous other situations requiring a deployable power solution. The system may also be used by individuals in personal applications, such as powering a home subject to a grid outage. It may also be used as a backup for infrastructure hardening.

The invention is a self-contained, deployable, renewable energy system that is configured to produce power using a combination of renewable resources including, but not limited to, solar and wind. The invention includes the option to incorporate all of the components required for solar power production, wind power production, power storage, and/or power management in a single housing. The system uses an open architecture approach. That is, the standardized interconnection system provides the capability to connect whatever power generation source selected to a central supply site. Further, it is scaleable, with individual systems linkable to one another in a "daisy chain" of power supply. The sources and distribution may be monitored and managed via remote diagnostics and control.

The invention is a system or, more specifically, an apparatus, incorporating a network of devices for producing and delivering power at a desired location via integrating power generation, storage, management and system reporting devices that, in aggregate, includes a first device or set of devices for generating electrical power from ambient (renewable) resources which is/are contained within or coupled to the apparatus, an optional second device or set of devices for generating electrical power from ambient resources or fossil resources which are/is contained within or coupled to the apparatus, a third device or set of devices for conducting the electric power from the first device and optional second device through the apparatus, a fourth device or set of devices for modulating the electrical power and converting it as needed, a fifth device or array of devices for storing power which is/are contained within or coupled to the apparatus, an optional sixth device or set of devices for information reporting of the performance of the system, all of which devices are containable in a conveyable housing, preferably of composite material construction (but not limited thereto), wherein the housing is of a design that is resistant to the elements and which allows for facile and rapid maintenance of the system. The system preferably is of modular form to allow for relatively easy integration, access to and removal of the devices.

The first device or set of devices includes a power generating device of renewable energy type for converting light, wind, hydrogen fuel, biofuels or motion into electricity, such as photovoltaics (PV), wind turbine, hydrogen fuel cell, liquid fuel generator and kinetic energy converters, contained within or coupled to the housing for generating electricity and transmitting said power via electrodes, wiring and connectors. If solar panels are employed, they are preferably integrated into the housing, such as into the top, panels and/or doors of the housing in a "clamshell" configuration for the purposes of panel protection, quick implementation and seamless integration. If solar panels including PV are employed, the PV selected are preferably interchangeable among an array of types of PV, be they of thin film, crystalline, or other type. Optionally, the exterior of the housing may include one or more additional power conversion items including, for example, surface-adhered conductive substances, such as conductive paints, but not limited thereto.

The optional second device or set of devices include(s) a second power generating device of renewable energy or fossil fuel type contained within or coupled to the housing for generating electricity and transmitting said power via electrodes, wiring, connectors, or the like. The fossil fuel type generator may be a natural gas driven generator, an oil driven generator, a propane driven generator, a diesel fuel driven generator, a fuel cell, or a gasoline driven generator. The third device or set of devices include(s) electrodes, electrical wiring and electrical inputs and outlets for conducting and controlling electricity through the system and from the system and are either contained within the apparatus or they extend from the apparatus.

The fourth device or set of devices includes electrical components suitable for modulating and/or converting power generated by the power generation devices described and may be, for example, electrical circuits arranged to receive electrical signals at voltages and currents to be expected and to modulate and/or convert them to produce output electrical signals suitable for plug-in power usage. The fifth device or set of devices of power storage type are contained within the apparatus for storing power and may be, for example, storage batteries. For purposes of the description of this invention, a "battery" is any charge storage device used for the purpose of storing charge to make available as a power supply. The sixth device or set of devices are contained within the apparatus for the purpose of remotely controlling and remotely monitoring the performance of the devices contained within the apparatus and of the apparatus. For example, the sixth device(s) may include a plurality of components, such as one or more sensors, one or more computing devices including at least one processor for receiving sensor signals, management signals, and to transmit management signals, computer programming to receive signals from the sensors and to produce signals indicative of the sensor information, an optional monitor for viewing sensor information, and an optional remote signaling system, such as a wireless communication system, to transmit status information and to receive management instructions.

The housing is of a modularized configuration and preferably includes one or more drawers, doors and access points for the purpose of easy and rapid servicing and maintenance of the system. For example, power generating equipment may be easily inserted into and removed from the housing. For purposes of the description of this invention, a "drawer" may be any type of device suitable for retaining thereon or therein one or more components, whether fixed or removable components. The drawer or drawers may be fixed, removable, slidable, rollable, or in some other manner movable from within the housing partially or completely out of the housing and back again. The housing incorporates materials and configurations to be as impervious as reasonably possible to the elements, including all-weather seals, marine venting, and such other features as those skilled in the art of outside housing structures would employ. The housing is preferably arranged for tamper resistance such as including, for example, anti-theft attachment devices to restrict access to the interior of the system to authorized personnel only. The system may be made in varying sizes and dimensions for varied applications. The housing is arranged to receive power from at least one of the first and second power generating devices within the conveyable housing, and to provide access to the received power in a plurality of different electrical configurations such as, for example, standard electric power conducting cords and/or sockets. The housing may also be arranged to provide for a plurality of coupling elements to be secured to the housing and configured to allow for the attaching of more than one type of power generating and storage device to the housing.

The housing may include connector components fixed to assist in securing elements to the housing for transport of the system. The housing may be fabricated to accept the forks of a forklift as well as secure the standard woven straps used to lift heavy equipment. Further, the housing may be fabricated with hand holds and indentations to aid in its movement and transport. The housing may include cut-outs and specially designed openings for the integration of gauges and monitors observable from the exterior. For example, the gauges and monitors may be protected by all-weather seals and impervious transparent materials. Still further, the housing may be arranged so that the power generating devices may be removably integrated and contained therein. The housing may be fabricated so as to accept solar "wings" that each contain a solar panel for expansion of power generation beyond that which may be available solely with a solar panel contained as part of the housing top and/or sides. In general in regard to the power generating devices, they may be selected and/or fabricated to be coupled to the exterior of the housing in a removable fashion. They may also be sized to fit completely within the housing.

The system of the present invention may be used for the purpose of supplying power where tie-in to a larger grid is not available. The system provides a method of conveying and utilizing a self-contained deployable power supply without the need of further assembly or installation on site. The method includes the steps of: integrating at least one power generating device within the housing; integrating power storage within the housing; conveying the unit to a desired location; opening the housing as necessary to deploy any renewable energy generating device; plugging electrically consumptive devices and/or connecting electricity transference wiring and connectors into the unit; and powering buildings and/or appliances as desired.

The present invention provides a deployable power supply system that avoids some or all of the aforesaid shortcomings in the prior art. These and other advantages will become more apparent upon review of the following detailed description, the accompany drawings and the appended claims.

BRIEF DESCRIPTION OF THE DRAWINGS

FIG. 9 is a front view of the control panel of the present invention.

FIG. 10 is a rear view of the control panel of FIG. 9.

FIG. 11 is a side view of the control panel of FIG. 9.

DETAILED DESCRIPTION OF THE INVENTION

Figure 1:
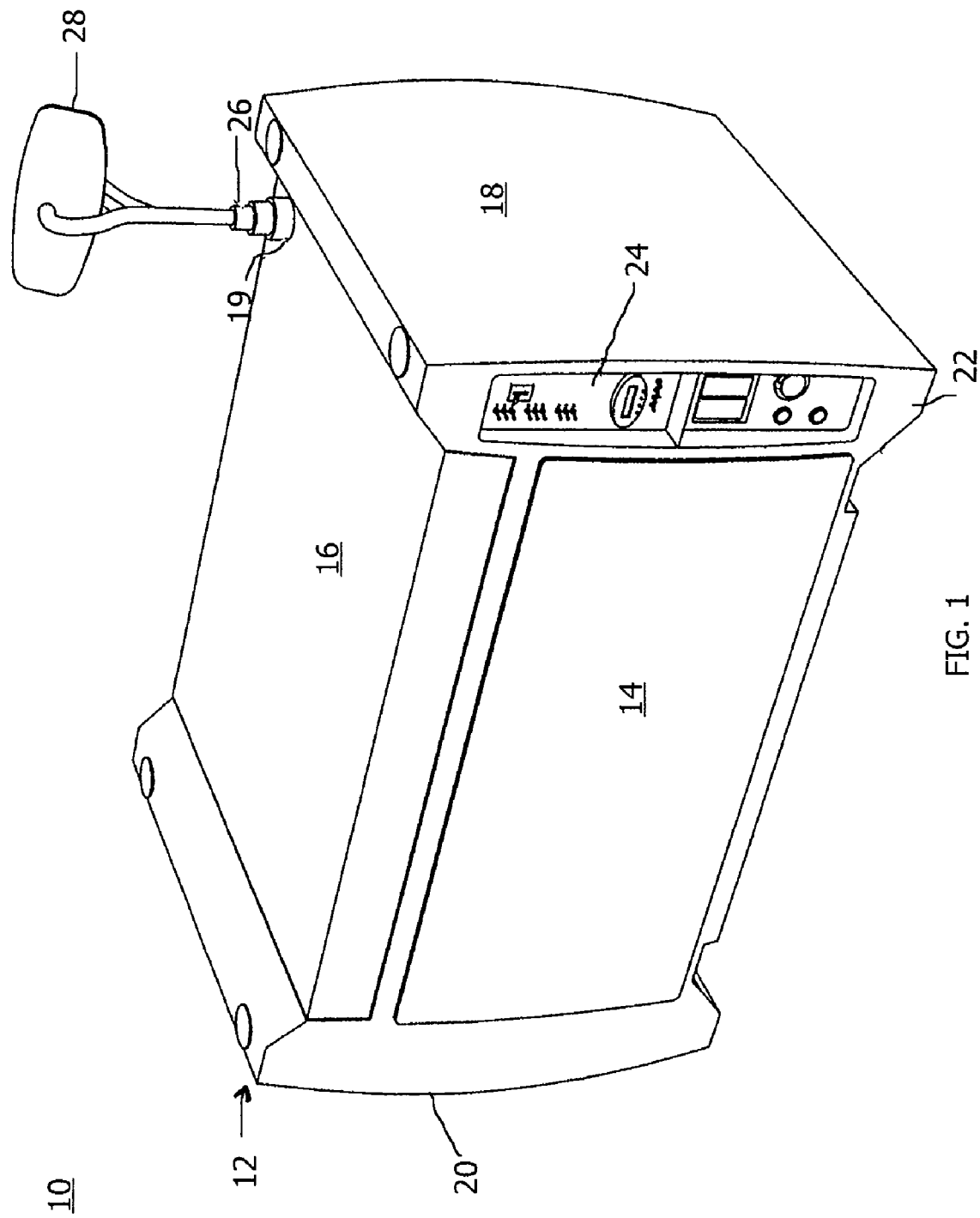
FIG. 1 is a perspective front view of the deployable power supply system of the present invention.

The present invention shown in FIG. 1 is a deployable power supply system 10 embodied in a housing 12 arranged for relative ease of movement and for storage of a plurality of components associated with power supply functionality at any selectable location. The housing 12 includes a front panel 14, a top panel 16, a first side section 18, and a second side section 20. The front panel 14 is removably attachable to a primary casing 22 and may be affixed to the primary casing 22 with attachment means, such as anti-theft attachment components, such as security bolting, for example. Anti-theft attachment components restrict access to devices within the housing 12 to authorized personnel only. The top panel 16 is hingedly or removably connected to the primary casing 22 to enable rotatable opening thereof. The first side section 18 includes a control panel 24 for management of power generation and distribution, and any other control functions of interest for the system 10. The first side section 18 optionally includes a pole retention port 19 for removable placement therein of a telescoping pole 26 that may terminate with a communications antenna 28 or other device to be extended upwardly from the housing 12. The communications antenna 28 may be connected to electronic communications equipment, such as a wireless phone, for example. The antenna 28 may be removable for storage within the housing 12. The telescoping pole 26 is an example of a deployable element arranged to extend beyond the dimensions of the housing 12 while remaining associated with one or more components of the housing 12.

Figure 2:
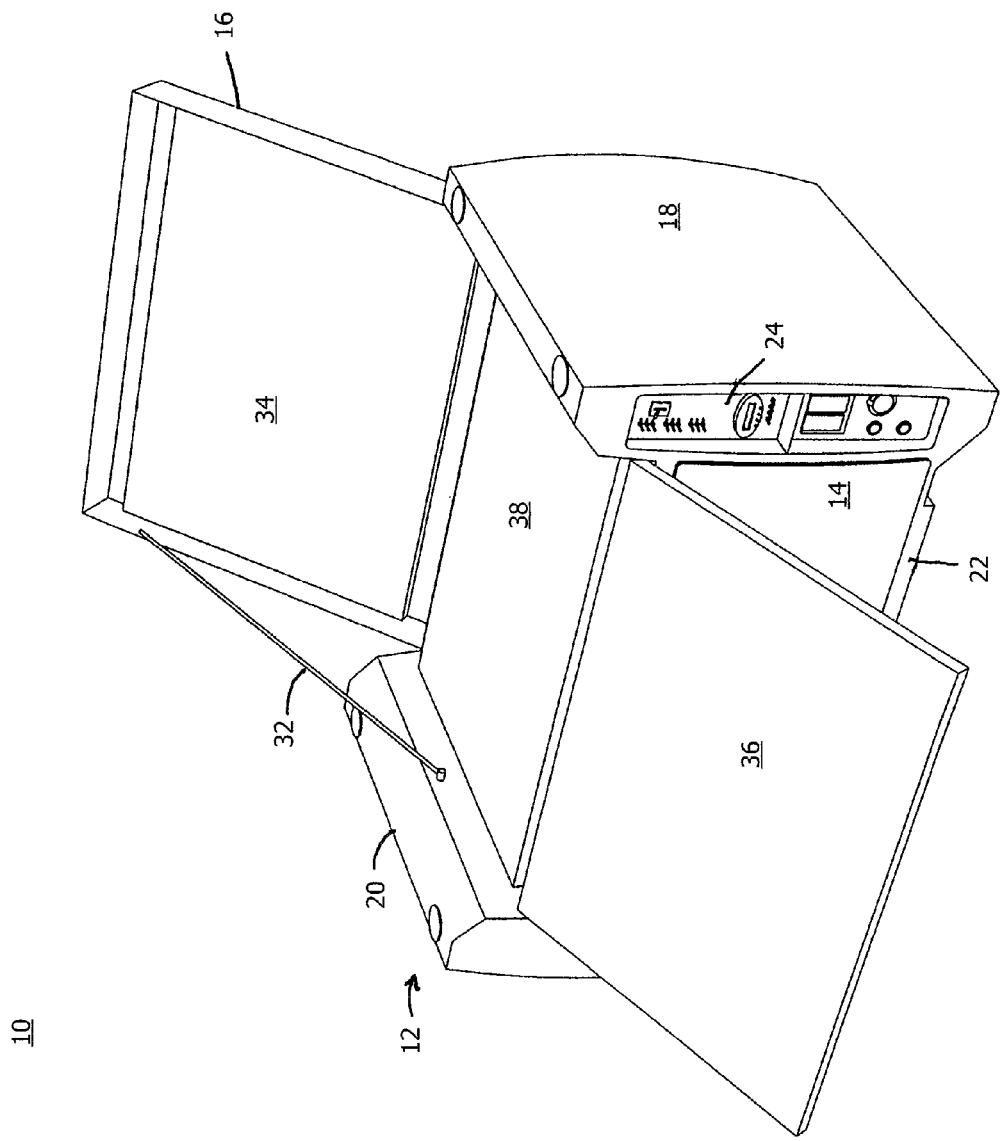
FIG. 2 is a perspective front view of the system with solar panels deployed.
Figure 3:
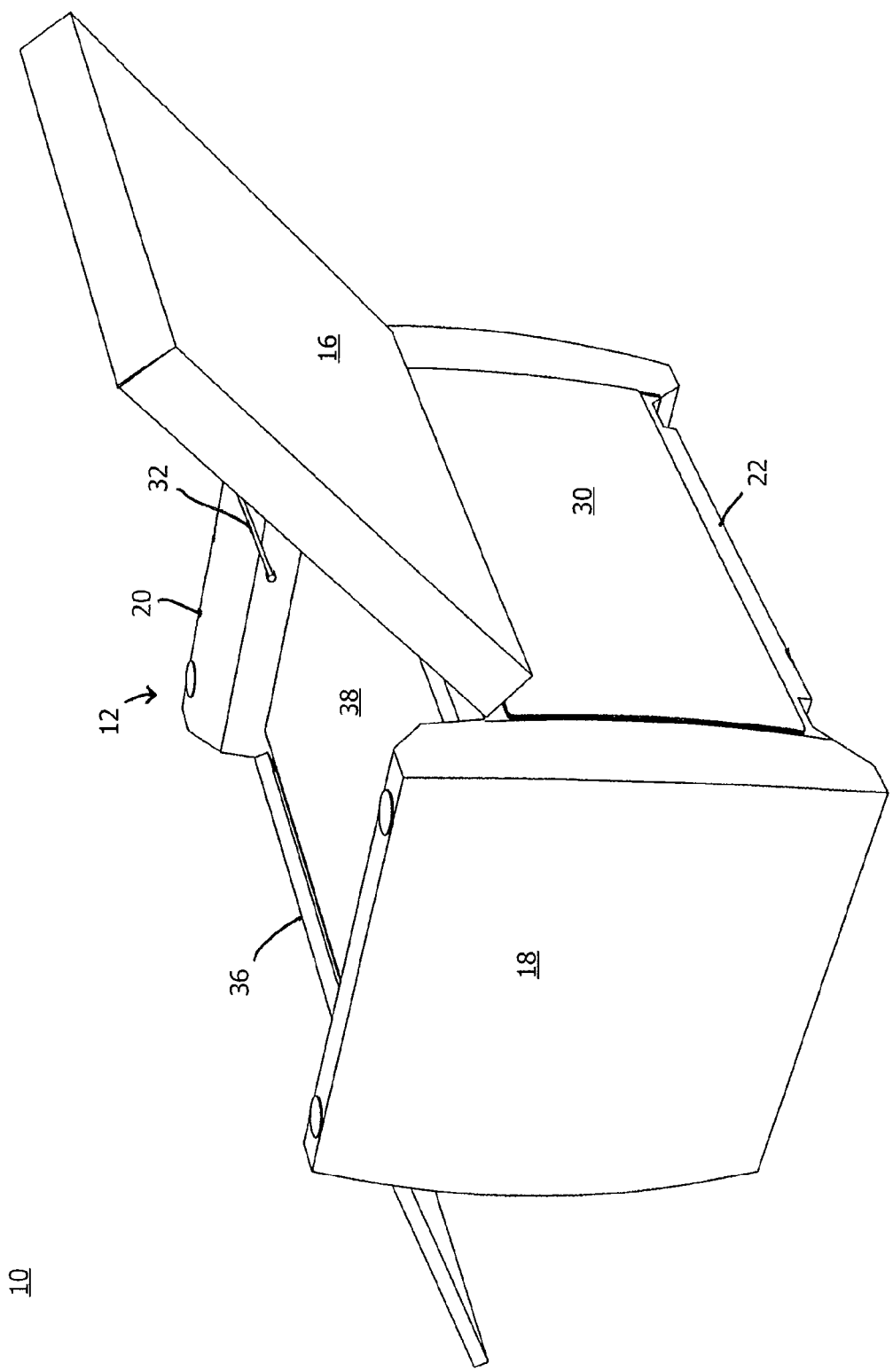
FIG. 3 is a perspective rear view of the system with solar panels deployed.

As illustrated in FIGS. 2 and 3, the top panel 16 is hingedly affixed to a rear section 30 and retained to the second side section 20 via a guy-wire 32. A portion of the interior area of the primary casing 22 exposed by opening the top panel 16 includes removably retained therein a first structure including a photovoltaic structure, such as may be included as part of a solar panel represented as first solar panel 34. Further, within the housing 12 below the first solar panel 34, a second photovoltaic structure, such as may be included as part of a solar panel represented as second solar panel 36 is retained therein such that when the top section 16 is opened, the second solar panel 36 is exposed. It is to be understood that while the term "solar panel" is employed in describing the preferred embodiments of the invention, such structures represent any type of device suitable for gathering solar energy for the purpose of conversion into another form of energy, including, for example electrical energy such as available through photovoltaic cells, fabrics or similar mechanism. As shown in FIG. 2, the second solar panel 36 is optionally hingedly affixed to the primary casing 22 near the front panel 14 so that it may be rotated out of the interior of the primary casing 22 to reveal a third solar panel 38 retained within the interior of the primary casing 22. The inclusion of one or more solar panels as part of the housing 12 provides one type of source of power available for use.

Figure 4:
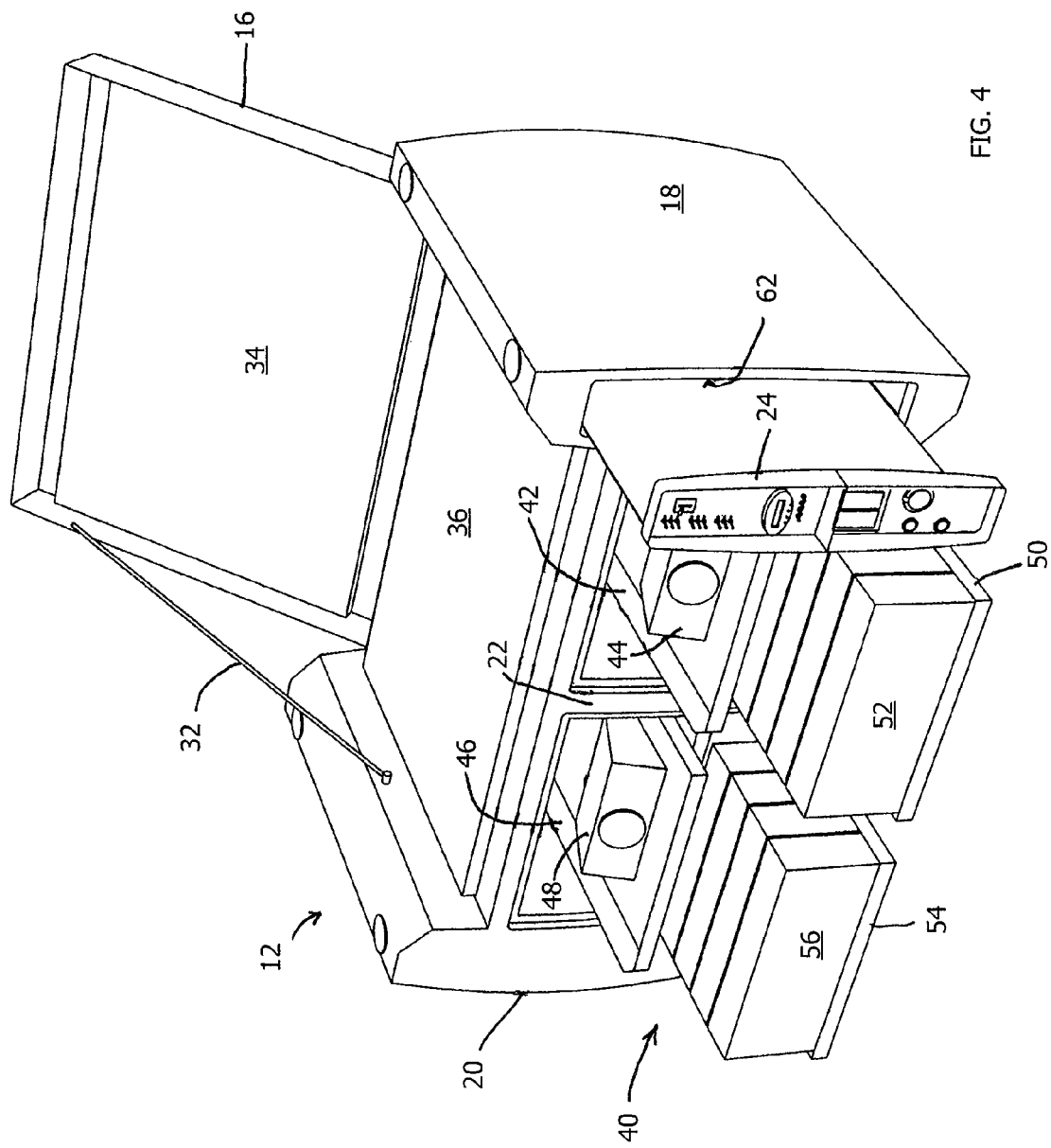
FIG. 4 is a perspective front view of the system with a solar panel deployed, drawers extended and the control panel partially extended.

With reference to FIG. 4, the front panel 14 may be removed to reveal a plurality of drawers 40 for retaining thereon within the interior of the housing 12 selectable devices for use in generating, storing and/or distributing power. For example, a first drawer 42 includes a first device 44, a second drawer 46 includes a second device 48, a third drawer 50 includes a first set of one or more charge storage devices, such as a set of chargeable batteries 52, and a fourth drawer 54 includes a second set of charge storage devices, such as a second set of chargeable batteries 56. The first and second set of devices 44 and 48 may be communications devices, small battery rechargers, or other devices requiring or providing power while in a remote location not readily accessible to grid power. The drawers are preferably slidable but may be rollable, hinged or fixed. It is to be noted that other devices may be included instead of the devices shown in FIG. 4, and that the devices placed in the drawers may be replaced with other types of devices or with replacements for the same types of devices. The battery sets 52 and 56 may be used to store electricity generated via the one or more solar panels or one or more other sources. If either or both of the first and second devices 44 and 48 is a communication device, it/they may be electrically coupled to the antenna 28 of FIG. 1.

Figure 5:
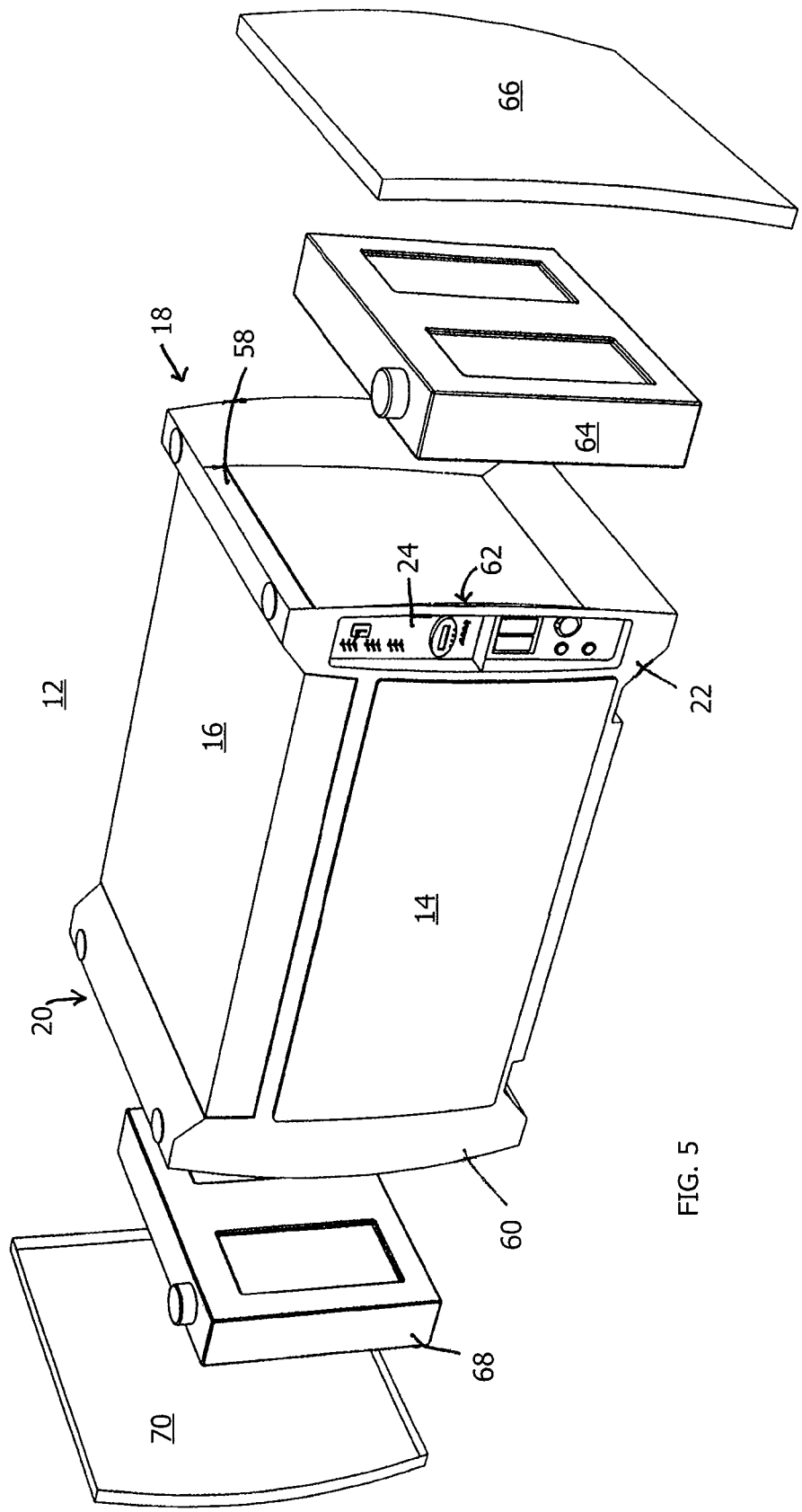
FIG. 5 is an exploded view of the housing showing the primary casing, internal containers and end caps.

An exploded view of an example of the housing 12 is illustrated in FIG. 5, showing primary components of the housing 12 and their orientation with respect to one another. The housing 12 includes the primary casing 22 with a first side structural frame 58 and a second side structural frame 60, wherein the first side structural frame 58 provides structural support for the first side section 18 and the second side structural frame 60 provides structural support for the second side section 20. The first side structural frame 58, either alone or in combination with the first side section 18, provides the structural frame to support and retain the control panel 24. Alternatively, the control panel 24 may be integrated directly into the first side section 18. As shown in FIG. 4, the control panel 24 may slide into and out of a slot 62 of the first side section 18. Cross beams establish structural integrity for the primary casing 22 and provide the means for joining the first side structural frame 58 to the second side structural frame 60. That joining may be accomplished either permanently, such as by welding, or removably, such as by bolting. Base cross supports may be used to further enhance the structural integrity of the primary casing 22, particularly to support heavy components contained within the housing 12, and when the housing 12 is moved from one location to another, such as by forklift, for example. Additional components may be combined as required to establish suitable structural integrity of the housing 12 as desired.

Figure 6:
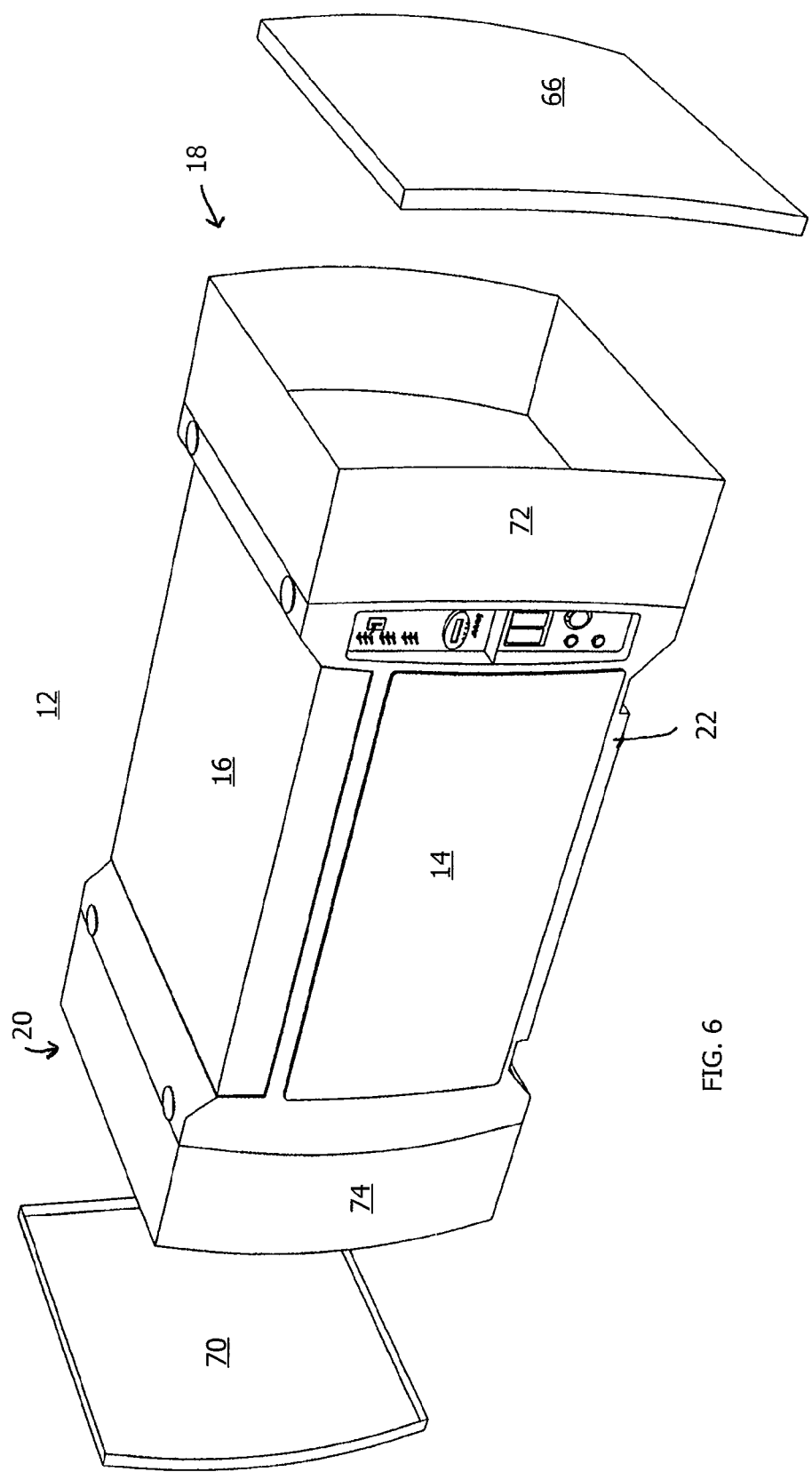
FIG. 6 is an exploded view of a second embodiment of the housing showing expansion frames.

With continuing reference to FIG. 5, the housing 12 is preferably arranged to include a first internal container 64 removably retained within a first end cap 66 of first side section 18, and a second internal container 68 removably retained within a second end cap 70 of second side section 20. The first end cap 66 and the second end cap 70 present the outward appearance of the housing 12 at the first side section 18 and the second side section 20, respectively. Either or both of the first internal container 64 and the second internal container 68 may be used as a fuel container, such as a container for fuel to supply a generator, or another fuel-supplied generator, whether located within or outside the housing 12. Alternatively, either or both of the first internal container 64 and the second internal container 68 may be used to store another type of liquid, such as water. An optional link pipe may be used to couple the first internal container 64 and the second internal container 68 together. Either or both of the first internal container 64 and the second internal container 68 may be arranged to be coupled to a power source, a water desalination component, or other selectable device and filled with the appropriate liquid for such purpose. The first internal container 64 and the second internal container 68 are arranged for easy replacement. As illustrated in FIG. 6, either or both of the first side section 18 and the second side section 20 may be expandable to expand the dimensions of the housing 12. Specifically, a first expansion frame 72 may be coupled between the first side section 18 and the first end cap 66, and a second expansion frame 74 may be coupled between the second side section 20 and the second end cap 70. That is, for example, the size of the housing 12 may be changed without changing the size of the primary casing 22 and without changing the end caps 66 and 70.

In the process for fabricating a preferred design of the housing 12 it is to be noted that the components may be permanently or removably connected together. These components may be fabricated of materials with enough structural integrity to provide the support required for the intended purpose of the deployable power supply system 10. They may be of selectable dimensions to define the size of the housing 12 as desired. One or more of these components may be fabricated of aluminum and the remainder of steel, for example. However, the present invention is not limited to any specific material used to fabricate the structural components and one or more may be fabricated integrally with one or more other structural components. The housing 12 is preferably fabricated primarily of nonmetallic materials selected to provide suitable structural integrity while also providing resistance to environmental conditions expected to be experienced wherever the system 10 is deployed. The primary casing 22 further includes internal framing suitable to retain the drawers therein. The internal framing is selected to provide sufficient structural integrity for the drawers to be removably retained thereon while allowing at least partial extension of the drawers out of the housing 12.

Figure 7:
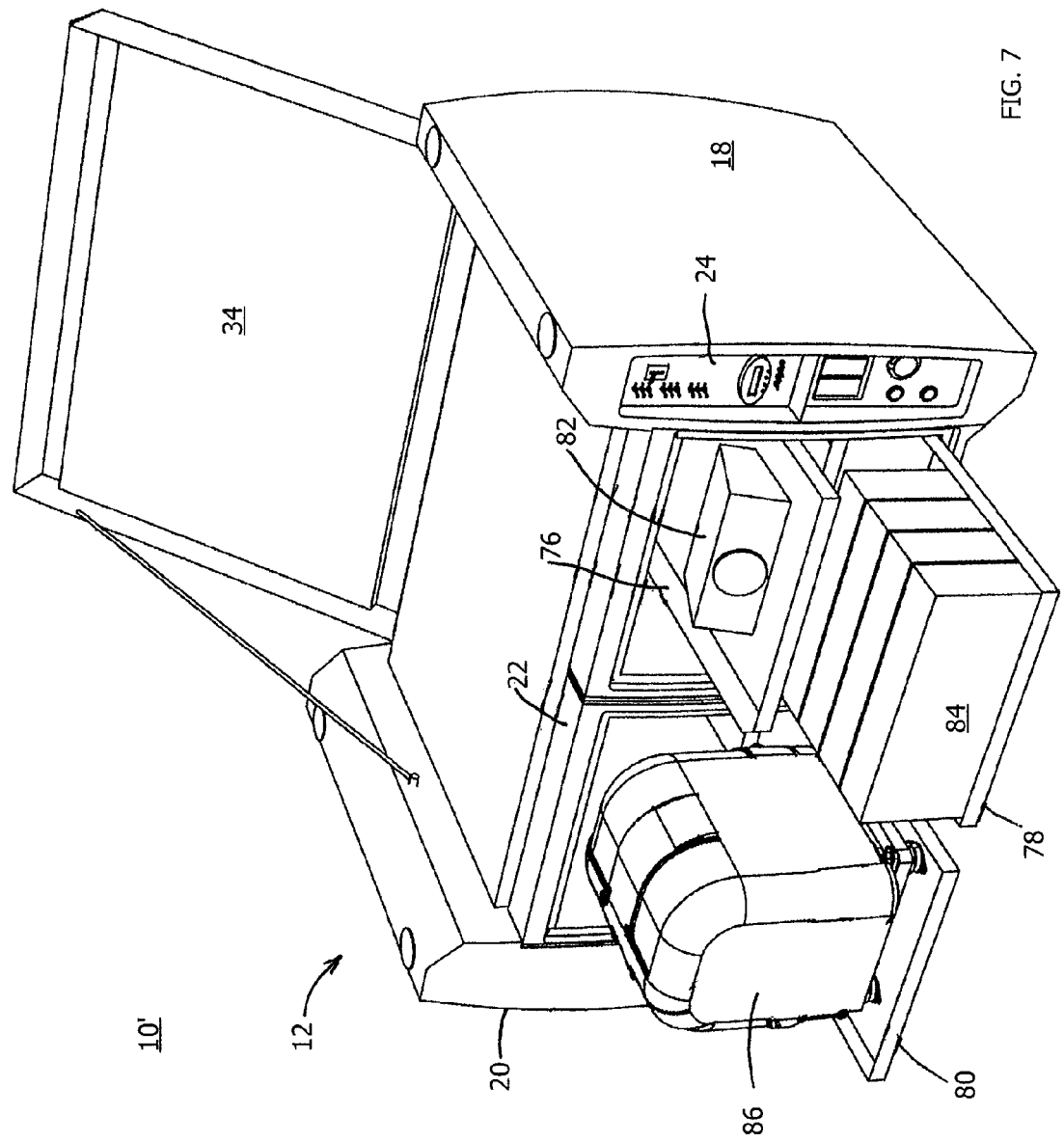
FIG. 7 is a perspective front view of a generic alternative embodiment of the system.

The system 10 provides a wide array of usage options embodied in a standardized structure that is the housing 12. These arrangements alternative to the use of devices other than those shown in FIG. 4 are represented in FIG. 7. For the alternative device usage options represented generically in FIG. 7, system 10' includes the housing 12 and the first solar panel 34. The system 10' further includes a set of drawers including first drawer 76, second drawer 78 and third drawer 80. The first drawer 76 includes a communications module 82, the second drawer 78 includes a set of charge storage devices, such as batteries 84, and the third drawer 80 is arranged to removably retained thereon any of a selectable variety of devices, represented as generic device 86. The communications module may include coupling sites, an optional system information monitor, management control inputs, and optional remote communication sites. Whether management control inputs are established through the control panel 24 or one or more devices retained in the drawers, such inputs provide command and control means for monitoring, modifying, and otherwise controlling operation of the system 10', whether locally or remotely. The controller established through the control panel 24 or in another way, may be programmed for coarse or fine control as desired using programming software suitable for manipulating the functionality of the devices retained in the housing 12, and for monitoring their outputs as desired.

The selectable devices represented by generic device 86 of FIG. 7 include, but are not limited to, an extra set of charge storage devices, a generator, a water maker, a charger station for charging portable devices requiring convenient charging locations. The extra battery option is suitable for large capacity battery storage and solar charging. It is suitable for backup in conditions where power is needed for low to medium periods of time. No onsite access is required and a plurality of units may be stacked together. The generator option represents a fuel-supplied power source and is suitable for medium capacity battery storage with solar generation and fuel-supplied generation. It is useful for backup in conditions where power is needed for medium to extended periods of time. No onsite access is required except to refuel the generator. Alternatively, the "generator" may be a Sterling engine, a form of fuel cell, a micro-turbine, or any other sort of device the generates power based on use of some form of fuel supply. A plurality of units may be stacked together. The water maker option includes a water maker preferably selected to purify fresh water and/or to make fresh water from a salt or brackish supply. The water maker may include, but is not limited to including, one or more pumps, one or more purification systems, and one or more filtration devices. It is to be noted that a water maker is but one example of the type of device that may be retained within the housing 12. The charger station option is suitable for providing at a remote location a standalone system for providing a power supply to charge battery-operated devices. For example, it may be used to charge a set of walkie-talkies used by members of the national park service who travel remote arrears with limited access to a charger. Other devices of interest requiring a power supply at a remote location may be included such as, by way of example only, a refrigeration device for maintaining the temperature of food, medicine, etc. No onsite access is required except and unless any type of refueling is required.

Figures 8A, 8B:
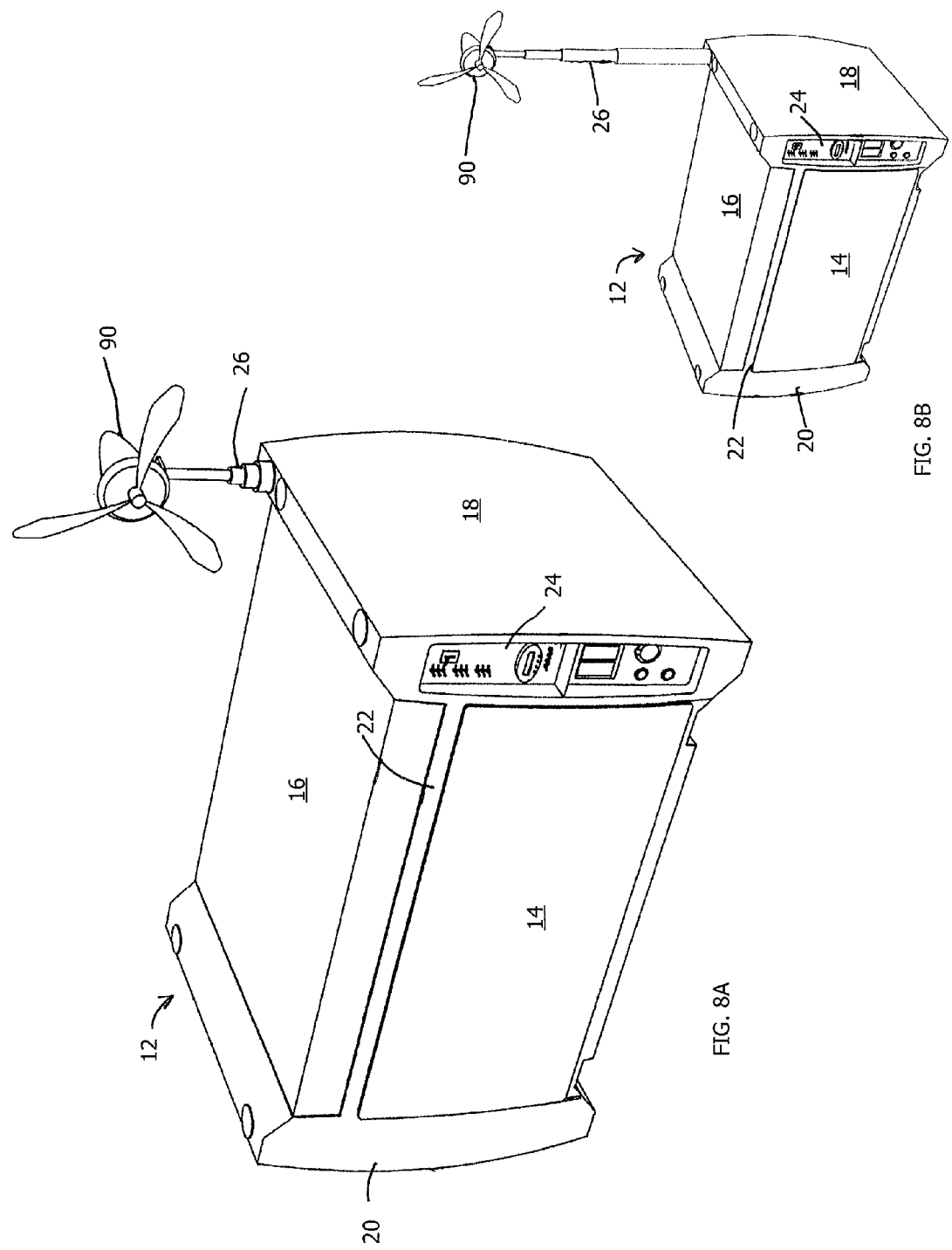
FIG. 8A is a perspective front view of the deployable power supply system with a small wind mill positioned on the telescoping pole collapsed.
FIG. 8B is a perspective front view of the deployable power supply system of FIG. 8A with the telescoping pole extended.

Another optional arrangement is shown in FIGS. 5A and 8B, in which a wind power generation source 90 is affixed to the telescoping pole 26. The wind power generation source 90 is coupled to the charge storage device within the housing 12. The system 10 as shown in FIG. 8B illustrates the telescoping pole 26 fully extended, wherein the pole 26 may be extended from the housing 12 using a crank or simply physically pulling it upward to extend it. The pole 26 may be stowed within the housing 12 such as through an integral port thereof. As noted, the telescoping pole 26 may be used to deploy a selectable variety of devices including, but not limited to, another solar panel or other devices of interest.

The drawer arrangements of the system 10 may include the use of all-in-one drawers in which all necessary components for a particular application, including any required connection ports, are contained in each individual drawer. That is, each drawer is a plug-and-play arrangement so that any function (such as a battery function, a control/electronics function, or a water making function, for example) may be contained in a drawer and one drawer may simply be substituted in its entirety for another. Further, they may be hot swappable so that the system 10 may remain online without loss of other functions as a new functioning drawer may be inserted in the port of a replaced drawer. This arrangement facilitates maintenance in that there would be no need to do any type of onsite fix. Instead, the defective drawer would simply be identified, onsite or remotely, and a replacement one brought to the system for a switch-out. Each drawer requiring any type of electrical or mechanical connection includes the appropriate couplings on the back panel thereof. The interior of the primary casing 22 includes mating couplings adapted to receiving the couplings of the back panels of the drawers.

The system 10 allows for easy deployment and switching out of any or all of the devices described herein based on the use of an integrative "hot swappable" or "plug-and-play" electrical connection arrangement. The control panel 24 presents a user interface including sockets, plugs, input pads or keys, switches, and the like, all of which are coupled to one or more circuit boards having interfaces suitable for connection to any devices of interest retained in or on the housing 12. The user interface may simply be a fascia removably integrated into the housing so that it may be switched out as required or desired, with interconnection pins on the backside thereof. Alternatively, the control panel 24 is not a fascia but instead a removable drawer or panel as shown in FIG. 4. As illustrated in FIGS. 9-11, a preferred embodiment of the control panel represented specifically as panel 300, includes a support structure 302 as an L-shaped structure (see specifically in FIG. 4). A front face 304 of the structure 302 includes a combination of switches, sockets and a display screen. The switches are removably coupled to relays fixed to a rear side 306 of the front face 304 of the panel 300. The relays are, in turn, coupled to wiring or any other electrical signal exchange device. The wiring extends to the interior section of the primary casing 22 at interface pins 307 used for the quick connect/disconnect to one or more electrical interfaces of the various optional power generation and power storage devices described herein. Manipulation of the switches on the front face 304 activate or deactivate the devices of the system 10. The panel 300 additionally includes electrical circuitry 308 arranged to transform, convert, or otherwise modify electrical signals to and from the devices, resulting in power supply with suitable electrical characteristics available as a source for one or more power sinks removably connectable to sockets 310. The support structure 302 is removably affixable to the housing 12, such as by connection to second side structural frame 56, for example.

Figure 12:
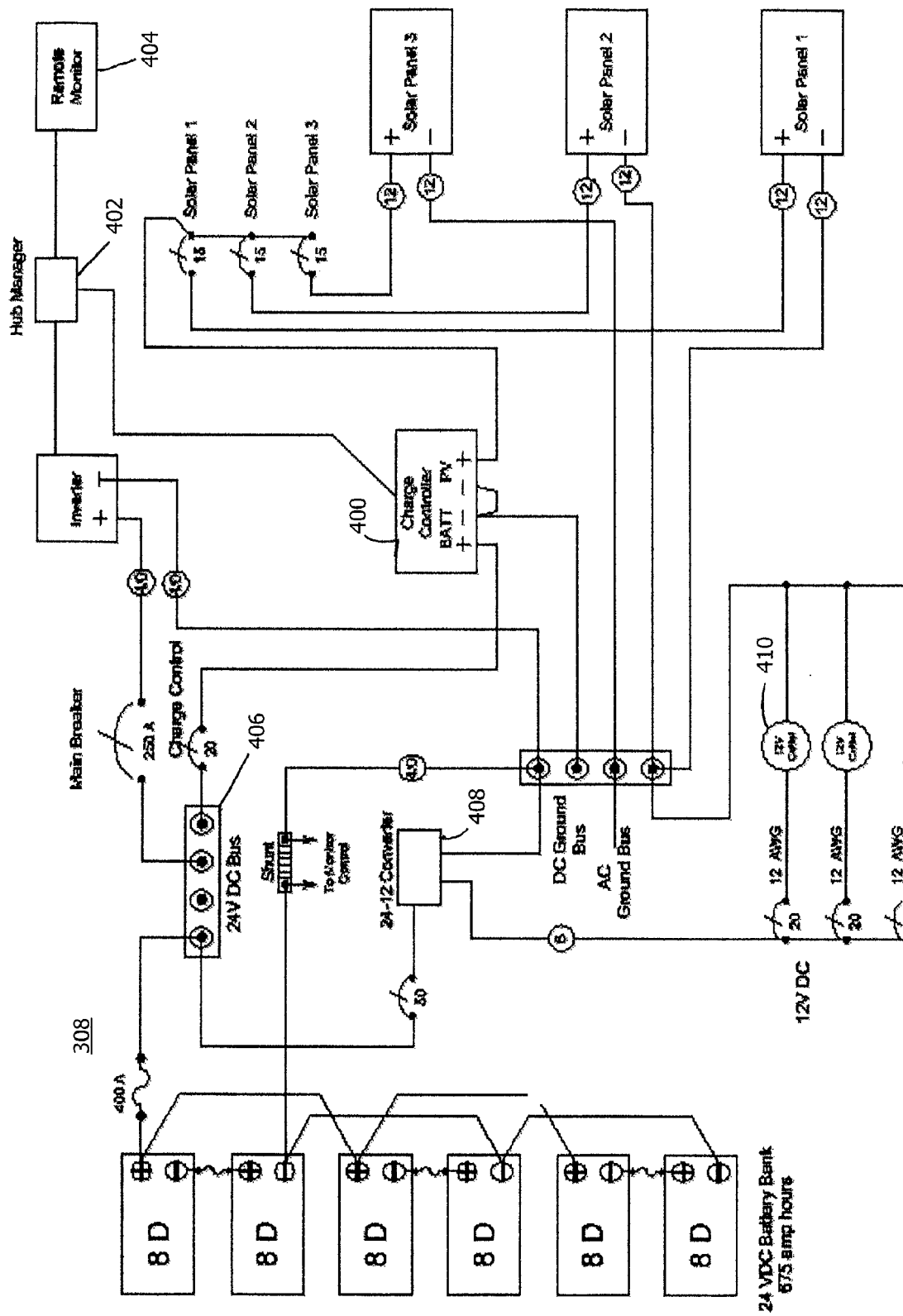
FIG. 12 is a schematic diagram of a first example electrical circuit of the control panel of the present invention.
Figure 13:
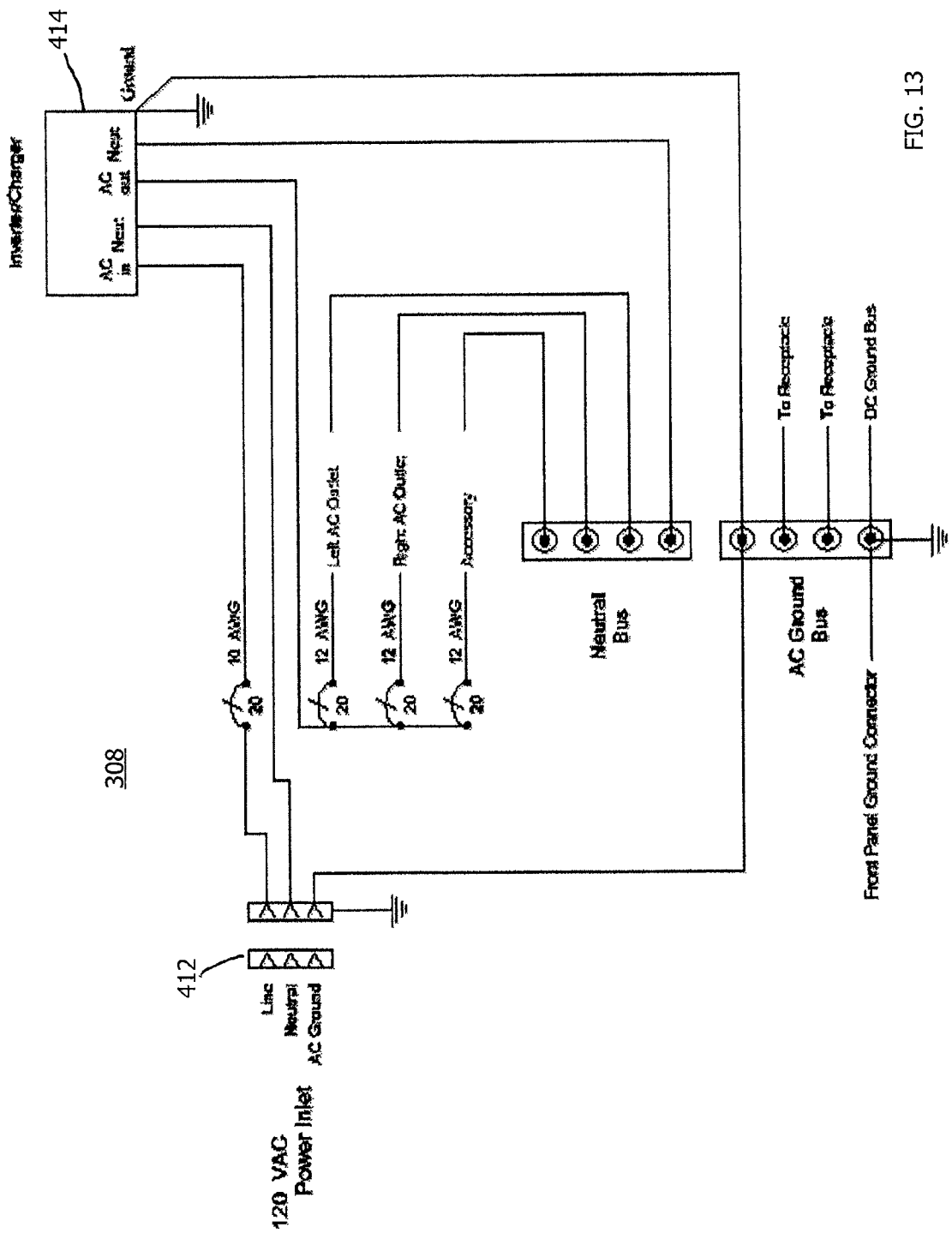
FIG. 13 is a schematic diagram of a second example electrical circuit of the control panel of the present invention.

A schematic diagram of one example of the electrical circuitry 308 is shown in FIG. 12 as an arrangement to establish an interface between a plurality of solar panels and a plurality of batteries. The circuit shown includes the electrical contacts of three solar panels coupled through individual circuit breakers to charge controller 400. The charge controller 400 is controlled by device manager 402, which may be monitored and managed directly or remotely through a remote monitoring device 404 having a wired or wireless connection to a communication system as previously described. The charge controller 400 is electrically coupled through a charge controller circuit breaker to 24V DC bus 406 and from there to a set of six batteries. The bus 406 is also coupled to a 24V-to-12V converter 408 to provide 12V charging for 12V outlets 410. As illustrated in FIG. 13, the electrical circuitry 308 may be arranged to establish an electrical connection to a grid-based supply, such as Shore Power inlet 412. The circuitry shown in the figure is used to step down, as needed, the incoming power signal through inverter 414 to provide AC power at an outlet on the front face 302 of the panel 300. It is to be understood that those of ordinary skill in the art, through review of the example diagrams, can foresee other arrangements of the electrical circuitry 308 to receive electrical signals from one or more external power sources converted into electrical signals, convert those electrical signals into electrical signals of suitable characteristics as required, either for storage, immediate availability, or a combination of the two. Electrical connections may be established by direct or indirect wire-to-wire interfaces, by quick disconnect contacts, pin-to-socket couplings, or other suitable mechanisms.

An aspect of the present invention that makes it deployable relatively easily while retaining attributes of a substantial power supply is the primary casing 22. The primary casing 22 is preferably a unitary component fabricated of a lightweight and sturdy material, such as a nonmetallic material including, for example, a fiber-reinforced resin such as fiberglass. The material used for the casing 22 and its connection to the other components of the housing 12 described herein is preferably selected to withstand deterioration that may otherwise result form environmental conditions to be experienced where the system 10 may be deployed. Further, fabrication of the casing 22 and other components, such as the end caps 66/70, of nonmetallic materials allows for ready fabrication of different sized structures to allow for different sizes of the housing 12 as desired. Dependent upon the fabrication method, the change of dimensions of particular components may be relatively simple to achieve. For example, the end caps 66/70 may be fabricated by infusion molding and the mold used therefor may be adjusted relatively easily, such as by adding spacers to increase internal dimensions, without requiring the fabrication of separate molds for each component of different dimensions. Fabrication of the housing 12 as a molded structure enables the production of ports, openings, interfaces of selectable dimensions and shapes. That fabrication flexibility ensures that environment-resistant interfaces exist where pieces are joined together, where removable components, such as control panel 24, are inserted, and where ports such as for the telescoping pole 26 are located. Moreover, that flexible fabrication capability enables the formation of primary components of selectable dimensions, enabling easy expansion of the dimensions of the housing 12.

Figure 14:
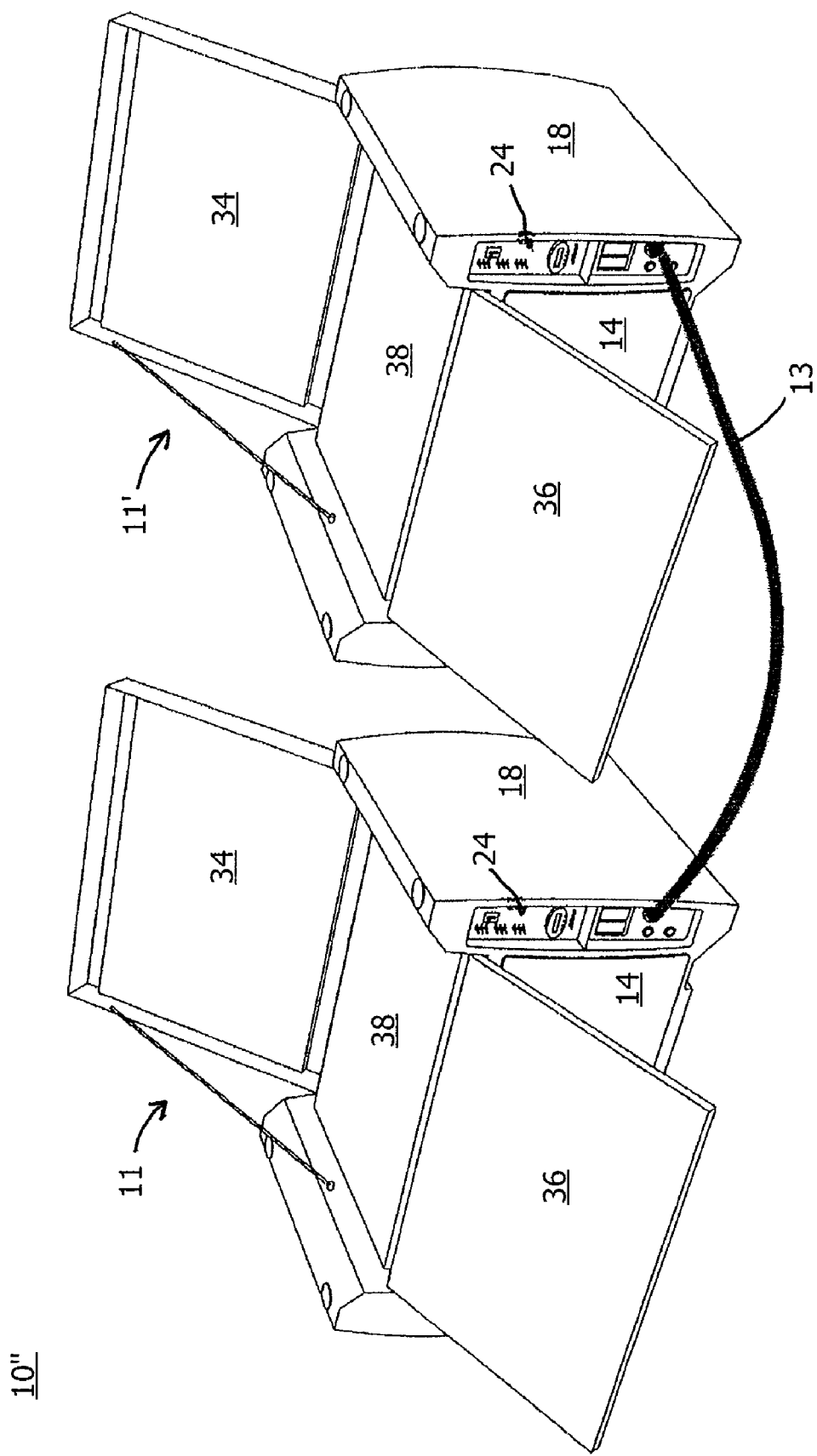
FIG. 14 a perspective front view of an alternative embodiment of the present invention with a plurality of individual systems daisy-chained together.

An example embodiment of the system of the present invention as a daisy chained combination of a plurality of individual systems is represented in FIG. 14 as system 10". The system 10" includes a first system 11 and a second system 11' coupled together by cable 13. Either or both of the first system 11 and the second system 11' may include one or more of the solar panels, such as solar panels 34, 36 and 38. Further, either or both of the first system 11 and the second system 11' may include one or more battery sets, and any one or more of the other devices described herein, or such other devices as deemed useful for the particular application. The two systems 11 and 11' may be joined together by the cable 13 to exchange power, control and command signals, or other information or instruction exchanges. Further, the daisy chain arrangement shown in FIG. 14 may represent other arrangements for combining two or more systems together or one or more systems with other devices including, by way of example only, a refrigerator, a water maker, or other device of interest that may not fit inside the housing 12. In general, combining two or more systems together allows for the supplementing of power to one or devices in need of power. It also allows for the provision of different devices together at the same location. It is to be understood that FIG. 14 is illustrative of the concept of combining a plurality of systems together and is in no way intended to limit the number of systems that may be joined together, nor to limit the operations that may be available by combining a plurality of systems together.

As illustrated in FIGS. 1-3, the housing 12 with the movable top panel 16 provides a structure with a self folding clamshell arrangement that retains therein the selectable power devices of interest and does so with greater resistance to damage from the surrounding conditions, including possible wind, rain, ice and snow damage. The fabrication of a nonmetallic housing 12 including the primary casing 22, the top panel 16 movably coupled to the primary casing 22 to establish a self-folding clamshell arrangement, and one or more moveable drawers retainable within the primary casing 22, protects the contents thereof from environmental conditions and for ease of movement of the system. The fabrication of the housing 12 with the primary casing 22 and the end caps 66/70 as standard components enhances fabrication efficiency in that a majority of the housing 12 may be fabricated with these standard components and then modified to satisfy a wide array of functions through use of different devices with selectable drawer arrangements. In addition, the overall dimensions of the housing 12 may be changed through use of the expansion frames 72/74 rather than with complete changes to the primary casing 22 or the end caps 66/70. It is to be noted that either or both of the first side section 18 and the second side section 20 may include one or more devices, such as an insertable device of choice. Optionally, the front panel 14 of the housing 12 may be fabricated to include one or more moveable drawers directly therethrough. In general, it is to be understood that the housing 12 may be fabricated with a variety of pieces, including the option of joining multiple replaceable side panels together if desired. Such panels may include pullout components, or slots for fixing components therein.

The present invention has been described with respect to various combinations of preferred components. Nevertheless, it is to be understood that various modifications may be made without departing from the spirit and scope of the invention as described by the following claims.

What is claimed is:

1. A deployable power supply system comprising:
a housing including a primary casing and a moveable panel hingedly connected to said primary casing to enable rotation of said moveable panel between an open position and a closed position that covers a portion of said primary casing, said primary casing including a first side section, a second side section, a front side, a rear side and a base portion, said moveable panel having a top panel forming a top portion of said housing;
at least one photovoltaic structure contained within said moveable panel in said closed position of said moveable panel and said at least one photovoltaic structure being exposed to the environment in said open position of said moveable panel, said first side section including a first upper portion and said second side section including a second upper portion, said first upper portion and said second upper portion extending beyond said top portion of said housing to form a cavity therebetween, said moveable panel disposed within said cavity;
at least one battery retained within said primary casing said primary casing and said moveable panel arranged such that said housing is impervious to environmental elements in said closed position; and
at least one electrical coupling to couple said at least one photovoltaic structure to said at least one battery.

2. The deployable power supply system of claim 1, wherein said primary casing is comprised of multiple pieces joined together at environment resistant interfaces.

3. The deployable power supply system of claim 1, wherein said housing further includes a deployable element arranged to extend beyond the dimensions of the housing.

4. The deployable power supply system of claims 3, wherein said deployable element is a telescoping pole for positioning an extendible device thereon.

5. The deployable power supply system of claim 1, wherein at least a portion of the housing is fabricated of a nonmetallic material.

6. The deployable power supply of claim 5, wherein said nonmetallic material is fiberglass.

7. The deployable power supply system of claim 1, wherein at least one of said first side section and said second side section includes one or more devices.

8. The deployable power supply system of claim 7, wherein at least one of said first side section and said second side section includes an insertable device.

9. The deployable power supply system of claim 1, wherein said housing further includes a first end cap on said first side section and a second end cap on said second side section.

10. The deployable power supply system of claim 9, wherein at least one of said first end cap and said second end cap is removably replaceable for access to said one or more devices.

11. The deployable power supply system of claim 9, further comprising at least one expansion frame to expand a dimension of said housing.

12. The deployable power supply system of claim 1, wherein said housing further includes a front panel at least one drawer accessible from said front panel.

13. The deployable power supply system of claim 1, wherein said moveable panel in combination with said primary casing establish a self-folding clamshell configuration.

14. The deployable power supply system of claim 1, wherein including one or more energy creating or energy using devices retainable in said housing and being selected from a group consisting of: a water maker, a generator, a battery set, and a battery charger.

15. The deployable power supply system of claim 1, wherein said moveable panel is fabricated from an impact resistance material.

16. The deployable power supply system of claim 1, wherein said first side section includes a first base cross support portion and said second side section includes a second base cross support, said first base cross support and said second base cross support extending beyond said base portion to form a first leg and a second leg and a gap therebetween at said base portion.

17. A deployable power supply system comprising:
   a housing including a primary casing and a moveable panel hingedly connected to said primary casing to enable rotation of said moveable panel between an open position and a closed position, said primary casing including a first side section, a second side section, a front side, a rear side and a base portion, said moveable panel having a top panel forming a top portion of said housing;
   at least one photovoltaic structure contained within said moveable panel in said closed position of said moveable panel and said at least one photovoltaic structure being exposed to the environment in an open position of said moveable panel, said first side section including a first upper portion and said second side section including a second upper portion, said first upper portion and said second upper portion extending beyond said top portion of said housing to form a cavity therebetween, said moveable panel disposed within said cavity;
   at least one battery retained within said primary casing, said primary casing and said moveable panel arranged such that said primary casing is impervious to environmental elements in both said open position and said closed position; and
   at least one electrical coupling to couple said at least one photovoltaic structure to said at least one battery.

18. The deployable power supply system of claim 17, wherein said moveable panel is hingedly affixed to a rear section of said primary casing and retained to one of said first or second side sections via a guy-wire, said guy-wire attached to said moveable panel and said one of said first or second side sections and supporting said moveable panel in said open position.

19. The deployable power supply system of claim 17, including a plurality of photovoltaic structures contained within said moveable panel in said closed position.

20. The deployable power supply system of claim 19, wherein at least one of said plurality of photovoltaic structures is hingedly affixed to a front section of said primary casing, at least one of said plurality of photovoltaic structures is fixed within said moveable panel, and at least one of said plurality of photovoltaic structures is fixed on said primary casing.

21. The deployable power supply system of claim 17, wherein said first side section includes a first base cross support portion and said second side section includes a second base cross support, said first base cross support and said second base cross support extending beyond said base portion to form a first leg and a second leg and a gap therebetween at said base portion.

* * * * *